United States Patent [19]

Huang

[11] Patent Number: 5,671,169

[45] Date of Patent: *Sep. 23, 1997

[54] APPARATUS FOR TWO-DIMENSIONAL INVERSE DISCRETE COSINE TRANSFORM

[75] Inventor: Po-Chuan Huang, Hsinchu, Taiwan

[73] Assignee: United Microelectronics Corporation, Taipei, Taiwan

[*] Notice: The term of this patent shall not extend beyond the expiration date of Pat. No. 5,668,748.

[21] Appl. No.: 494,597

[22] Filed: Jun. 23, 1995

[51] Int. Cl.⁶ .................................................. G06F 17/14
[52] U.S. Cl. ............................................ 364/725; 382/250
[58] Field of Search ...................................... 364/725, 726, 364/727, 754, 768; 382/248, 250

[56] References Cited

U.S. PATENT DOCUMENTS

| | | | |
|---|---|---|---|
| 5,257,213 | 10/1993 | Kim et al. | 364/725 |
| 5,343,501 | 8/1994 | Kadono et al. | 364/726 |
| 5,483,475 | 1/1996 | Kao | 364/725 |
| 5,528,528 | 6/1996 | Bui | 364/725 |

FOREIGN PATENT DOCUMENTS

| | | |
|---|---|---|
| 0 412 252 | 2/1991 | European Pat. Off. |
| 0 424 119 | 4/1991 | European Pat. Off. |

*Primary Examiner*—Reba L. Elmore
*Assistant Examiner*—Emmanuel L. Moise
*Attorney, Agent, or Firm*—Cushman Darby & Cushman IP Group of Pillsbury Madison & Sutro LLP

[57] ABSTRACT

An apparatus for real time 2-D IDCT comprises a rate buffer, a pair of multiplexers, a plurality of registers, a plurality of parameter extractors, a plurality of accumulators, a plurality of summing elements, a pair of truncators, a transpose buffer and an inverse rate buffer. In the present invention, data input rate of the rate buffer and output rate of the inverse rate buffer are a first rate, while the transform process, which is carried out between the rate buffer and the inverse rate buffer, is at a second rate. Moreover, a distributed arithmetic structure is utilized in the invention to decrease the circuit complexity and increase the operating efficiency. Therefore, real time 2-D IDCT can be achieved by the apparatus of the present invention.

11 Claims, 5 Drawing Sheets

APPARATUS FOR TWO-DIMENSIONAL INVERSE DISCRETE COSINE TRANSFORM

BACKGROUND OF THE INVENTION

1. Field of Invention

The present invention relates to an apparatus for digital signal processing, and more specifically, to an apparatus for real time two-dimensional inverse discrete cosine transform (IDCT) suitable for implementation in a very large scale integrated (VLSI) circuit.

2. Description of Related Art

A number of international video standards, such as Joint Photographic Experts Group (JPEG), Motion Picture Experts Group (MPEG) and H.261, require a circuit for fast video data coding or compressing. Increasing data transformation efficiency during data coding or compressing has become the most important issue. Since the IDCT process is one of orthogonal transform techniques which has a high transformation efficiency, it has been widely used in video systems for data coding.

Even though some effort has been made to simplify the IDCT algorithm, a conventional IDCT circuit, as is shown in FIG. 1 (Prior Art), is still very complicated. In addition, the operational efficiency of the FIG. 1 (Prior Art) circuit arrangement does not satisfy the real time requirements of the above-mentioned standards. For instance, in order to reduce the circuit dimensions, methods such as data feedback may be adopted in the circuit design, thus increasing the execution time of data transformation. Without skillful arrangement of data flow or timing relationships, operation rates of the IDCT circuit are too low to conform the requirements of the aforementioned international standards. These disadvantages will become clearer by the following explanation of the prior art circuit.

The circuit of FIG. 1 (Prior Art), which is a 1-D IDCT circuit, includes a combinational circuit 10 for receiving input data, a number of transformation circuits 12 through 19 for processing the input data and a number of post-processing elements for generating output data. Each of transformation circuits 12 through 19 comprises a memory device 22, a multiplier 24, a register 26, an adder 28, an accumulator 30 and another register 32. As to the post-processing elements, two multiplexers 34 and 36, an adder 37, a subtractor 38 and a permutation circuit 40 are provided. This circuit can carry out the 2-D IDCT algorithm by performing two successive 1-D transformations. That is, 2-D IDCT results can be obtained by connecting two circuits of FIG. 1 (Prior Art) in series or having a feedback from permutation circuit 40 to combinational circuit 10 of the IDCT circuit.

However, since the multiplier in each transformation circuit 12 through 19 has a very low operating rate, the transformation efficiency of the IDCT circuit is affected. Moreover, because the FIG. 1 (Prior Art) circuit performs twice the 1-D IDCT processes to obtain 2-D results, real time operation is difficult to achieve. Though read-only-memory (ROM) devices can take the place of the multipliers of the IDCT circuit to increase operational efficiency, ROM devices with very large capacity are required for the 2-D transformation. Therefore, the circuit dimension will be too large to be integrated into a VLSI circuit.

SUMMARY OF THE INVENTION

Accordingly, the present invention provides a 2-D IDCT circuit having a distributed arithmetic structure, so as to reduce circuit complexity and increase transformation efficiency.

The present invention also provides a 2-D IDCT circuit comprising elements operated at various rates for high speed data transformation thus satisfying the real time requirement.

The present invention further provides a 2-D IDCT circuit having a specific data flow and timing, thus decreasing the circuit dimension and facilitating its implementation in a VLSI circuit.

An apparatus for real time 2-D IDCT according to the present invention comprises a rate buffer, a pair of multiplexers, a plurality of registers, a plurality of parameter extractors, a plurality of accumulators, a plurality of summing elements, a pair of truncators, a transpose buffer and an inverse rate buffer. Data is input to the rate buffer and output from the inverse rate buffer at a first rate. However, the transform process, carried out between the rate buffer and the inverse rate buffer, is carried out at a second rate. Moreover, a distributed arithmetic structure is utilized in the invention to decrease the circuit complexity and increase the operating efficiency. Therefore, the circuit arrangement according to the present invention is capable of carrying out real time 2-D IDCT and can be integrated into a VLSI arrangement.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE PREFERRED EMBODIMENT

Figure 1:
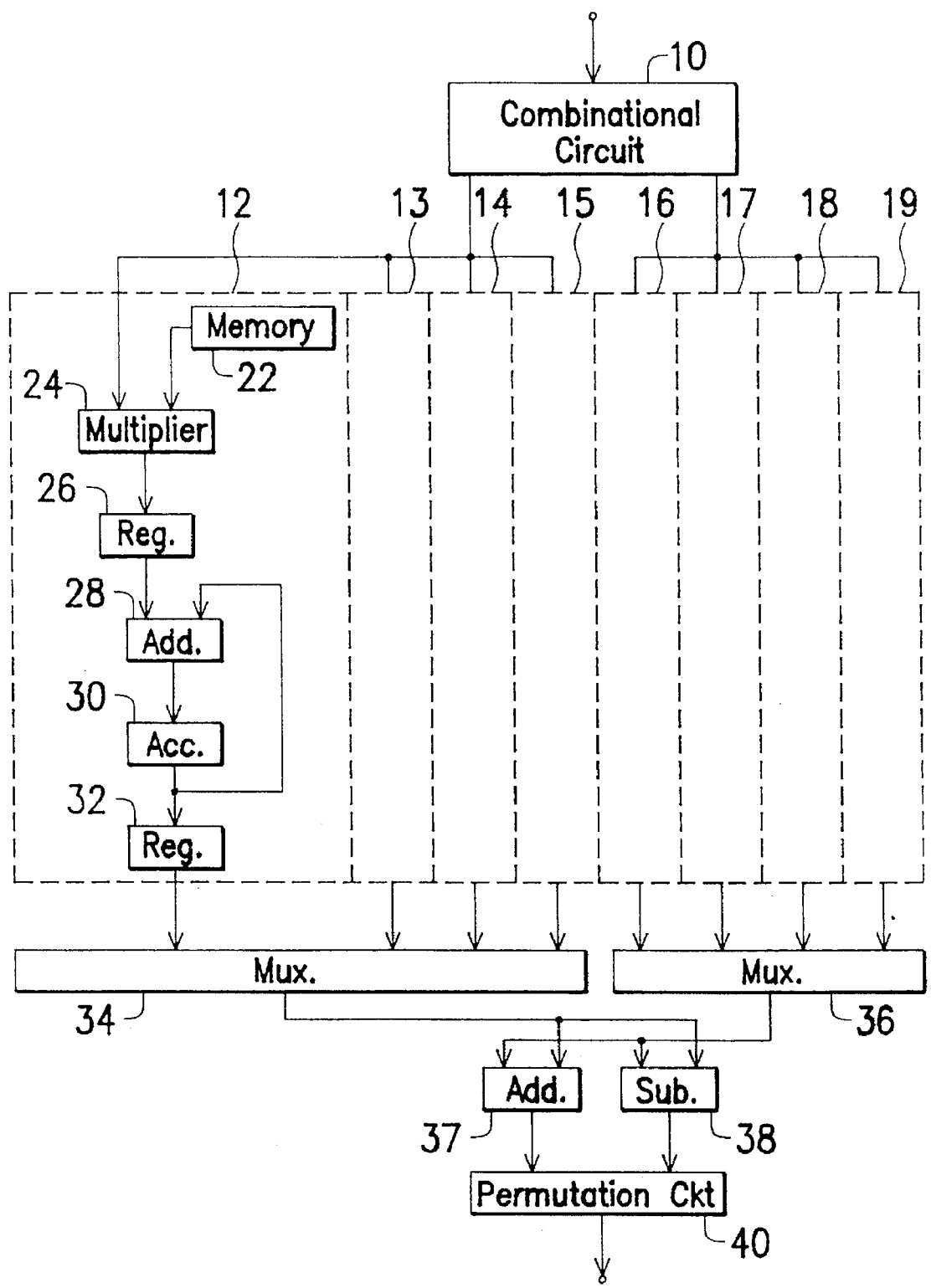
FIG. 1 (Prior Art) is a block diagram illustrating a prior art IDCT circuit.

Prior to describing the IDCT circuit of a preferred embodiment of the invention, the IDCT algorithm will be explained. In order to simplify the following description, a data matrix having a dimension of 8×8 is taken for example. Of course, the present invention is not limited to an 8×8 dimension. If an input data matrix $\underline{Y}$ of the IDCT circuit has elements $Y_{uv}$, which will be transformed into $X_{ij}$ and thus composing an original matrix $\underline{X}$, the transformation equation can be expressed as Eq. (1).

$$X_{ij} = \frac{1}{4} \sum_{u=0}^{7} \sum_{v=0}^{7} C(u)C(v)\cos\frac{(2i+1)u\pi}{16} \cos\frac{(2j+1)v\pi}{16} Y_{uv}, \quad (1)$$

where parameters C(u) and C(v) are $$C(u), C(v) = \begin{cases} \frac{1}{\sqrt{2}}, & (u,v=0) \\ 1, & (u,v \neq 0) \end{cases}, \text{respectively}. \quad (2)$$

In general, the expression of Eq. (1) can be rearranged to Eq. (3) to simplify the calculation.

$$X_{ij} = \quad (3)$$

$$\frac{1}{2} \sum_{v=0}^{7} C(v) \cos \frac{(2j+1)v\pi}{16} \left[ \frac{1}{2} \sum_{u=0}^{7} C(u) \cos \frac{(2i+1)u\pi}{16} Y_{uv} \right]$$

That is, the direct 2-D algorithm of Eq. (1) is reduced into double 1-D processes of Eq. (3).

Therefore, the IDCT equation can be expanded into matrix expression, as is shown in Eq. (4), which can more properly describe the row and column calculation in an IDCT process.

$$\begin{bmatrix} x_0 \\ x_1 \\ x_2 \\ x_3 \\ x_4 \\ x_5 \\ x_6 \\ x_7 \end{bmatrix} = \begin{bmatrix} A & B & A & C & D & E & F & G \\ A & C & -A & -B & E & -G & -D & -F \\ A & -C & -A & B & F & -D & G & E \\ A & -B & A & -C & G & -F & E & -D \\ A & -B & A & -C & -G & F & -E & D \\ A & -C & -A & B & -F & D & -G & D \\ A & C & -A & -B & -E & G & D & F \\ A & B & A & C & -D & -E & -F & -G \end{bmatrix} \begin{bmatrix} y_0 \\ y_1 \\ y_2 \\ y_3 \\ y_4 \\ y_5 \\ y_6 \\ y_7 \end{bmatrix} \quad (4)$$

with elements of:

$$A = \frac{1}{2} \cos \frac{\pi}{4}, B = \frac{1}{2} \cos \frac{\pi}{8}, C = \frac{1}{2} \sin \frac{\pi}{8}, D = \frac{1}{2} \cos \frac{\pi}{16},$$

$$E = \frac{1}{2} \cos \frac{3\pi}{16}, F = \frac{1}{2} \sin \frac{3\pi}{16}, G = \frac{1}{2} \sin \frac{\pi}{16}$$

Because of its symmetrical properties, the dimension of the 8×8 matrix in Eq. (4) can be further reduced. Therefore, much simplified expressions of the IDCT process which include calculation of 4×4 matrices are shown in Eq. (5) and (6).

$$\begin{bmatrix} x_0 \\ x_1 \\ x_2 \\ x_3 \end{bmatrix} = \begin{bmatrix} A & B & A & C \\ A & C & -A & -B \\ A & -C & -A & B \\ A & -B & A & -C \end{bmatrix} \begin{bmatrix} y_0 \\ y_2 \\ y_4 \\ y_6 \end{bmatrix} + \begin{bmatrix} D & E & F & G \\ E & -G & -D & -F \\ F & -D & G & E \\ G & -F & E & -D \end{bmatrix} \begin{bmatrix} y_1 \\ y_3 \\ y_5 \\ y_7 \end{bmatrix} \quad (5)$$

$$\begin{bmatrix} x_7 \\ x_6 \\ x_5 \\ x_4 \end{bmatrix} = \begin{bmatrix} A & B & A & C \\ A & C & -A & -B \\ A & -C & -A & B \\ A & -B & A & -C \end{bmatrix} \begin{bmatrix} y_0 \\ y_2 \\ y_4 \\ y_6 \end{bmatrix} - \begin{bmatrix} D & E & F & G \\ E & -G & -D & -F \\ F & -D & G & E \\ G & -F & E & -D \end{bmatrix} \begin{bmatrix} y_1 \\ y_3 \\ y_5 \\ y_7 \end{bmatrix} \quad (6)$$

Obviously, there are only two different multiplications of matrices in Eq. (5) and (6). If two matrices $\underline{M}$ and $\underline{N}$ are defined as $$\underline{M} = \begin{bmatrix} M_0 \\ M_1 \\ M_2 \\ M_3 \end{bmatrix} = \begin{bmatrix} A & B & A & C \\ A & C & -A & -B \\ A & -C & -A & B \\ A & -B & A & -C \end{bmatrix} \begin{bmatrix} y_0 \\ y_2 \\ y_4 \\ y_6 \end{bmatrix} \text{ and } \underline{N} = \quad (7)$$

$$\begin{bmatrix} N_0 \\ N_1 \\ N_2 \\ N_3 \end{bmatrix} = \begin{bmatrix} D & E & F & G \\ E & -G & -D & -F \\ F & -D & G & E \\ G & -F & E & -D \end{bmatrix} \begin{bmatrix} y_1 \\ y_3 \\ y_5 \\ y_7 \end{bmatrix},$$

Eq. (5) and (6), i.e., the equations for IDCT process, can be expressed as $$\begin{bmatrix} x_0 \\ x_1 \\ x_2 \\ x_3 \end{bmatrix} = \begin{bmatrix} M_0 \\ M_1 \\ M_2 \\ M_3 \end{bmatrix} + \begin{bmatrix} N_0 \\ N_1 \\ N_2 \\ N_3 \end{bmatrix} \text{ and } \begin{bmatrix} x_7 \\ x_6 \\ x_5 \\ x_4 \end{bmatrix} = \begin{bmatrix} M_0 \\ M_1 \\ M_2 \\ M_3 \end{bmatrix} - \begin{bmatrix} N_0 \\ N_1 \\ N_2 \\ N_3 \end{bmatrix}. \quad (8)$$

In other words, the IDCT result, matrix $\underline{X}$, can be obtained from adding and subtracting 4×4 matrices $\underline{M}$ and $\underline{N}$.

Since the operation of multipliers are too slow for the matrix calculation, the ROM devices are utilized in the present invention for IDCT parameter extraction, thus facilitating matrix calculation. The present invention utilizes a distributed arithmetic structure to realize the above-mentioned calculation. The distributed arithmetic structure can reduce the capacity requirements of the ROM devices. Eq. (9) is a multiplication of 4×4 matrices.

$$\begin{bmatrix} O_0 \\ O_1 \\ O_2 \\ O_3 \end{bmatrix} = \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \begin{bmatrix} I_0 \\ I_1 \\ I_2 \\ I_3 \end{bmatrix} \quad (9)$$

where parameters C, I and O have m, n and m+n bits, respectively. Therefore, Eq. (9) can be rewritten as $$O_i = \sum_{j=0}^{3} C_{ij} I_j, \text{ for } i = 0, \ldots, 3 \quad (10)$$

Furthermore, if $I_j$ is represented as 2's complement, i.e., $$I_j = -I_{j0} + \sum_{k=1}^{n-1} I_{jk} 2^{-k} \quad (11)$$

where $I_{j0}$ is sign bit and bit 0 is the most significant bit (MSB), Eq. (10) can be represented as $$O_i = \sum_{j=0}^{3} C_{ij} \left( -I_{j0} + \sum_{k=1}^{n-1} I_{jk} 2^{-k} \right) = \quad (12)$$

$$\sum_{j=0}^{3} C_{ij}(-I_{j0}) + \sum_{k=1}^{n-1} \left[ \sum_{j=0}^{3} C_{ij} I_{jk} 2^{-k} \right]$$

The last term of Eq. (12) is calculated by selecting valves of $C_{i0}$ through $C_{i3}$, based on the weighting of parameters $I_0$ through $I_3$. For example, when k=4 and $I_{04}I_{14}I_{24}I_{34}$=1011, the value of the last term of Eq. (12) will be $C_{i0}+C_{i2}+C_{i3}$. Therefore, if the values of $I_{0k}I_{1k}I_{2k}I_{3k}$ have been decided, the value of the last term of Eq. (12) can be obtained from a 16-word ROM device where predetermined values of $C_{i0}I_{0k}+C_{i1}I_{1k}+C_{i2}I_{2k}+C_{i3}I_{3k}$ are stored. In the present invention, each word of the ROM device consists of m+n bits. Thus, the calculation of Eq. (12) can be carried out by n-multiple accumulation of results from the 16-word ROM device and a (m+n)-bit adder/subtractor.

Figure 2:
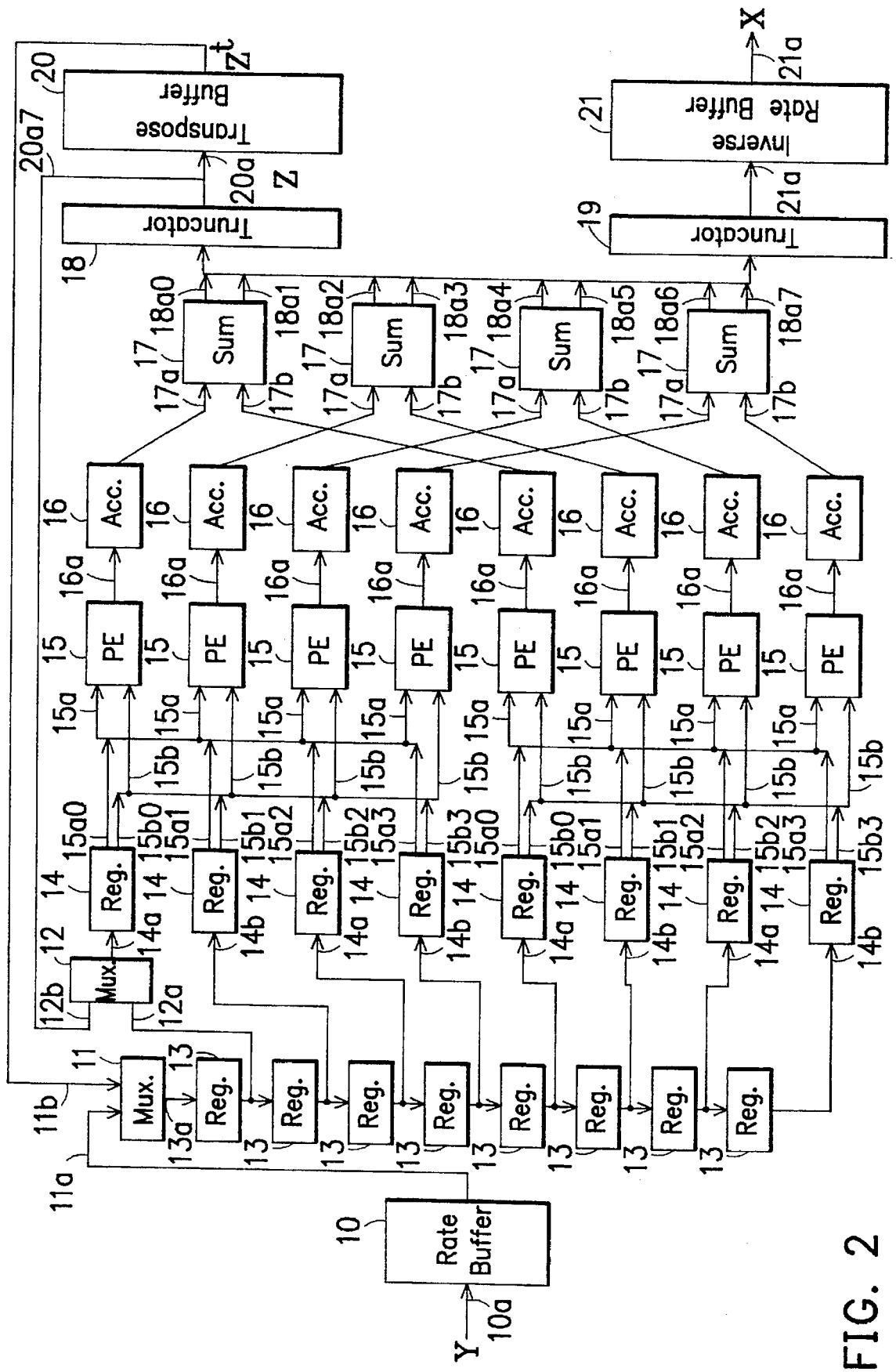
FIG. 2 is a circuit diagram illustrating a 2-D IDCT circuit according to the present invention.

Accordingly, a preferred embodiment of the present invention will be described in accompaniment with the circuit diagram of FIG. 2. If input matrix $\underline{Y}$ has a dimension of N×N, the 2-D IDCT circuit of the present invention comprises a rate buffer 10, two multiplexers 11 and 12, N first registers 13, N second registers 14, N parameter extractors 15, N accumulators 16, N/2 summing elements 17, a pair of truncators 18 and 19, a transpose buffer 20 and an inverse rate buffer 21. The operation of the individual elements of the 2-D IDCT circuit will now be explained.

Rate buffer 10 receives data input at a first rate and outputs data at a second rate. That is, elements of input matrix $\underline{Y}$ are input to rate buffer 10 at the first rate. Then a rearranged data sequence is output to multiplexer 11 from rate buffer 10 at the second rate. The second rate is preferably two times faster than the first rate. The various data input/output rates can be achieved by providing driving signals of different frequencies at input terminal and output terminal of rate buffer 10. Therefore, a two-speed transform operation can be achieved inside the 2-D IDCT circuit.

Multiplexer 11 and 12 both provide two data paths for data transmission. A first data path 11a is provided by multiplexer 11 for the rearranged input data sequence from rate buffer 10. This data path is active during a first 1-D IDCT process. When the first 1-D IDCT process is finished, a second 1-D IDCT process begins and a second data path 11b is provided instead of the first data path by multiplexer 11 for transmitting another data sequence from transpose buffer 20.

First registers 13 are connected in series. One of first registers 13 is connected to first multiplexer 11 for acquiring data and then sequentially writing the data to a next first register 13. These first registers 13 are 1-word registers whose word length depends on the precision requirements of the communication standard that the IDCT circuit is based on.

Figure 3:
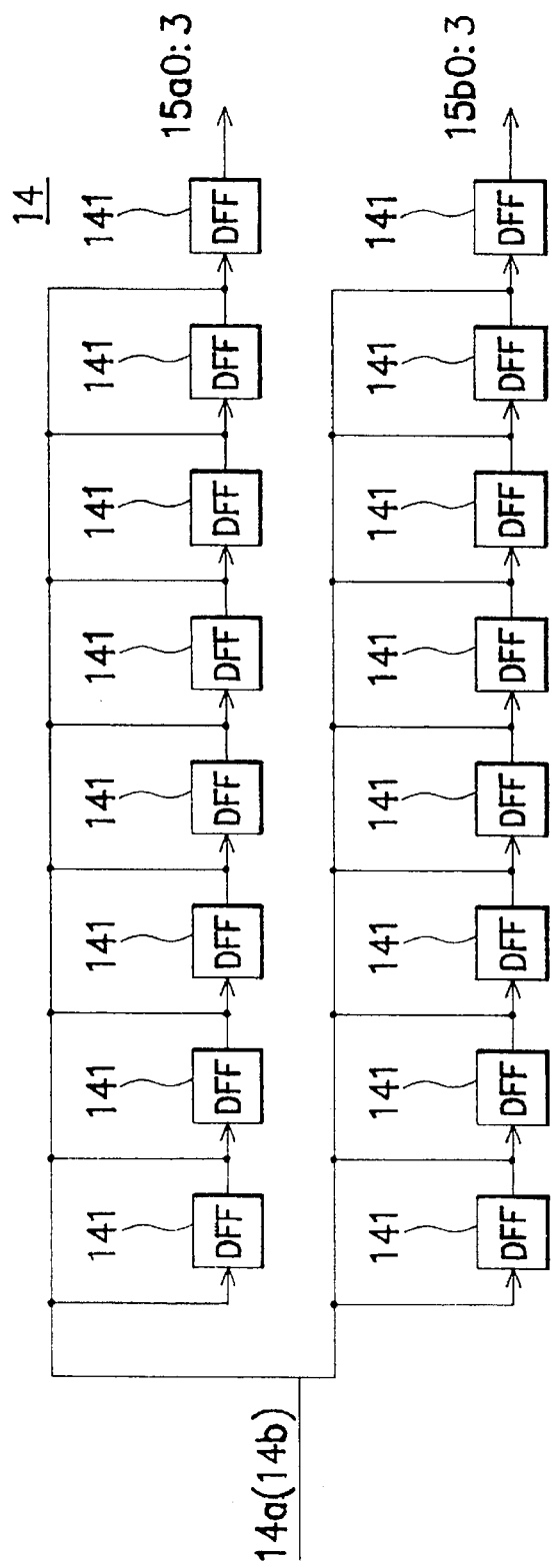
FIG. 3 is a detailed block diagram of register 14 shown in FIG. 2.

Second registers 14 are also 1-word registers. Second registers 14 have 1-word input data, while two 1-bit data per clock cycle are outputted from terminal 15a and 15b respectively. The structure of registers 14 is depicted in FIG. 3, wherein eight 1-bit registers 141 are connected in series to provide an odd-bit data path for terminal 15a, while an additional eight registers are connected in series to provide an even-bit data path for terminal 15b.

Figure 4:
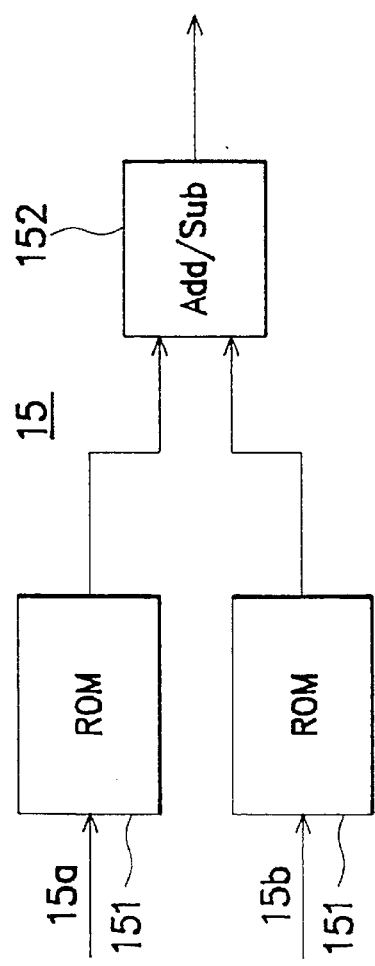
FIG. 4 is a detailed block diagram of a parameter extractor 15 shown in FIG. 2.

Each parameter extractor 15 comprises two 16-word ROM devices 151 and an adder/subtractor 152, as is depicted in FIG. 4. The word length in parameter extractor 15 is m+n bits. As defined in Eq. (9), m and n depend on the communication standard that the IDCT circuit is based on. Since the input data from terminal 15a is one order less than that from terminal 15b, the parameter extracted from ROM device 151 at terminal 152a must have 1-bit shift to the right prior to add to or subtract from that at terminal 152b. Only when a sign bit appears at terminal 15b, is the subtracting calculation performed, or adder/subtractor 152 performs the adding calculation.

Figure 5:
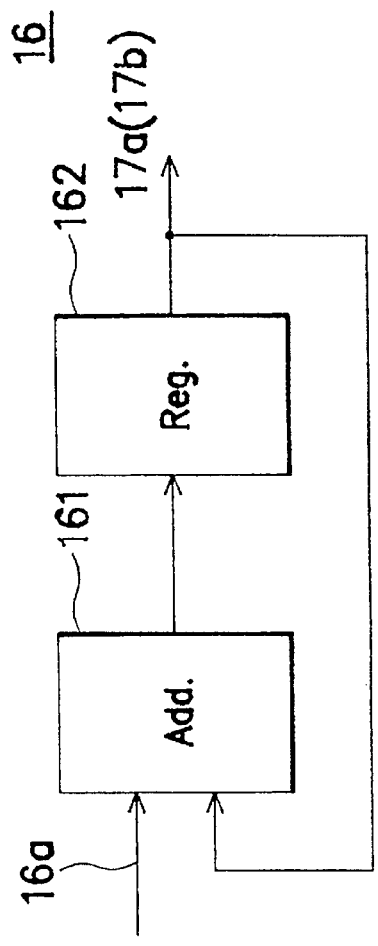
FIG. 5 is detailed block diagram of an accumulator 16 shown in FIG. 2.

Each accumulator 16, as is depicted in FIG. 5, comprises an adder 161 and a register 162. Accumulation of parameters from parameter extractor 15 is carried out by adder 161 which adds each input data from terminal 16a into the data stored in register 162, thus accumulating data therein.

Figure 6:
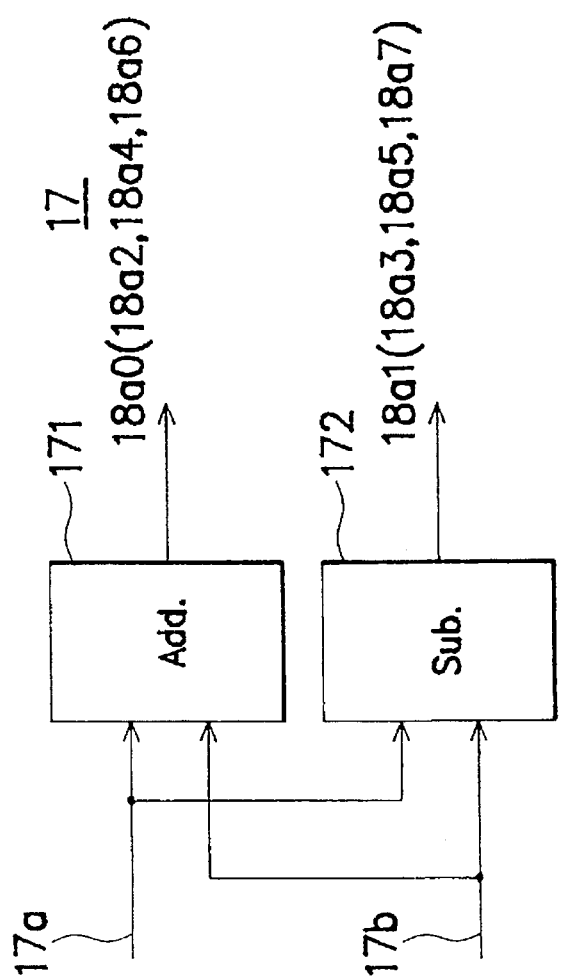
FIG. 6 is a detailed block diagram of a summing element 17 shown in FIG. 2.

Each summing element 17 comprises an adder 171 and a subtractor 172, as is depicted in FIG. 6. Summing elements 17 are provided for executing the adding and subtracting calculation of Eq. (8), thus obtaining the first and second 1-D IDCT results at terminals 18a0 through 18a7.

Truncator 18 is provided for truncating the first 1-D IDCT results into m-bit values to simplify the second 1-D IDCT process. Truncator 19 is provided for truncating the second 1-D IDCT results into 9-bit data to conform to the requirements of communication standards.

Transpose buffer 20 has a dimension of N×N (8×8 in the preferred embodiment). The first 1-D IDCT results are stored in transpose buffer 20 during the first 1-D IDCT process. The stored data, which is denoted as matrix $\underline{Z}$, is transposed into another data matrix $\underline{Z}^t$. Matrices $\underline{Z}$ and $\underline{Z}^t$ are in 1-D format like that of the sequence from matrix $\underline{Y}$, as is stated above. Then during the second 1-D IDCT process, matrix $\underline{Z}^t$ is sent to multiplexer 11.

As to inverse rate buffer 21, a data input rate of the second rate and a data output rate of the first rate are required to be consistent with rate buffer 10. During the second 1-D IDCT process, the second 1-D IDCT results are stored in inverse rate buffer 21, and then output as data matrix $\underline{X}$ at the first rate. The various data input/output rates can be achieved by providing driving signals of different frequencies at input terminal and output terminal of inverse rate buffer 21.

Figure 7:
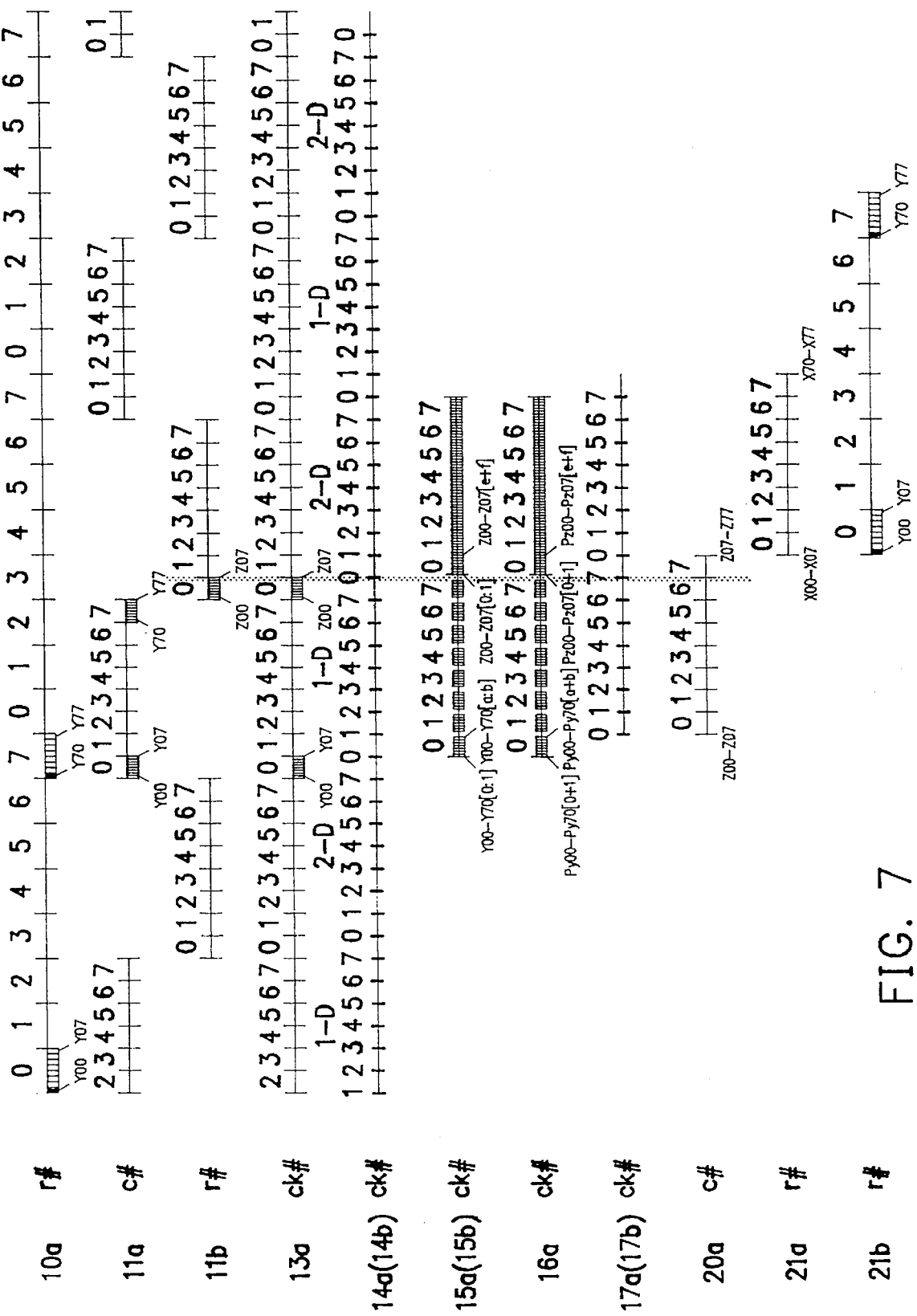
FIG. 7 is a timing diagram illustrating the operation of the circuit in FIG. 2.

The operation of the 2-D IDCT circuit of the present invention will be described with reference to the timing diagram shown in FIG. 7. Referring to FIG. 2 and FIG. 7, elements of input data matrix $\underline{Y}$ are successively written into rate buffer 10 and stored therein through terminal 0a, in the order of row by row, known as a "raster scan" manner. When the first element of the last row of matrix $\underline{Y}$, i.e., element $Y_{70}$ in the preferred embodiment, is about to write in rate buffer 10, data stored therein begins to be read out through terminal 11a. Output data of rate buffer 10 is a sequence of $Y_{0k}$, $Y_{2k}$, $Y_{4k}$, $Y_{6k}$, $Y_{1k}$, $Y_{3k}$, $Y_{5k}$ and $Y_{7k}$, with k form 0 to 7, which are different from the input sequence. These data sequences can be observed in the first and second lines of FIG. 7.

During the first 1-D IDCT process, i.e., the first 1-D IDCT process, multiplexer 11 provides its first data path for input data $Y_{uv}$. Therefore, each element of matrix Y can be sequentially written into register 13 through rate buffer 10 and multiplexer 11. Whenever eight words of data have been written into register 13, the data is sent to register 14 as simultaneously. Each word stored in register 14 is read out once two bits through terminals 15a0:3 and 15b0:3, referring to FIG. 3. Since the weighting of terminals 15a0, 15a1, 15a2 and 15a3 are the same and that of 15b0, 15b1, 15b2 and 15b3 are the same too, there can be two 4-bit buses 15a and 15b formed by the two sets of data output terminals. As mentioned above, data in bus 15b is an order higher than that in bus 15a.

Data in buses 15a and 15b are written into parameter extractor 15 to select corresponding parameters in ROM devices 151. These parameters, as the partial sums of Eq. (12), are summed up in adder 152 and then output at terminals 16a.

After accumulating the data of terminals 16a by accumulators 16, transformed results of 4×4 matrices, shown in Eq. (7) and (8), are obtained. Therefore, the first 1-D IDCT results can be obtained through adding or subtracting calculation of the transformed results by summing elements 17. Since the 1-D IDCT results may have a word length longer than that required for achieving desired data precision, truncator 18 is provided to truncate the 1-D IDCT results, thus eliminating circuits for processing the redundant bits. Since only the first m bits of 1-D IDCT results are remained, the circuit can be more condensed and the timing is easy to control.

The transformed data from truncator 18, i.e., elements of matrix $\underline{Z}$, are stored and transposed in transpose buffer 20. When the second 1-D IDCT process begins, the elements of matrix $\underline{Z}$ are sent to first multiplexer 11 for the second 1-D IDCT process. In the preferred embodiment, the second 1-D IDCT process begins when the first element of the sixth column of matrix $\underline{Z}$, i.e., $Z_{06}$ is written into transpose buffer 20. The output sequence of transpose buffer 20 is a sequence of $Z_{k0}$, $Z_{k1}$, $Z_{k2}$, $Z_{k3}$, $Z_{k4}$, $Z_5$, $Z_{k6}$ and $Z_{k7}$ with row number k. When element $Z_{07}$ is about to transform in the second 1-D IDCT process, depicted as the left dash line of FIG. 7, it is not yet ready to be sent out from transpose buffer 20. Therefore, a feedback from truncator 18 is provided to directly transmit element $Z_{07}$ to second multiplexer 12 for the second 1-D IDCT process. Thus, in general, second multiplexer 12 provides a third data path for the data from first register 13 to second register 14, while during the moment that element $Z_{07}$ is required, a fourth data path is provided by second multiplexer 12 as a short cut.

Operation of the second 1-D IDCT process is similar to that of the first 1-D IDCT process, except for providing the second data path by first multiplexer 11 for transposed data, i.e., the elements of matrix $\underline{Z}$. When the second 1-D IDCT process is successively carried out, output data of the 2-D IDCT circuit, i.e., elements of matrix $\underline{X}$, are generated and truncated by truncator 19, and then written into inverse rate buffer 21. Finally, matrix $\underline{X}$ is output at the first rate from inverse rate buffer 21, as is shown in the last line of FIG. 7.

Through the two-speed operation of the 2-D IDCT circuit, a real time transformation can be achieved. Furthermore, as compared with the conventional circuit of FIG. 1 (Prior Art), a distributed arithmetic structure including the first and second registers, the parameter extractors, the accumulators and the summing elements is provided in the present invention to replace the function of transformation circuit of the prior art circuit. Since the distributed arithmetic structure utilizes ROM devices for matrix calculation, the operation efficiency is improved. Moreover, through the various address modes provided by the rate buffer and inverse rate buffer, the wiring between each element can be simplified and the circuit dimension of the present invention can be largely reduced, and the hardware design is much easier. Therefore, the present invention is more suitable for a VLSI implementation.

What is claimed is:

1. An apparatus for real time two-dimensional inverse discrete cosine transform (IDCT) comprising:

a rate buffer for inputting N×N data at a first rate and outputting the data at a second rate;

a first multiplexer for providing first and second data paths for data transmission, the first data path being provided for data from the rate buffer during a first 1-D IDCT process, and the second data path being provided for transposed data during a second 1-D IDCT process;

N first registers connected in series, one of the first registers being connected to the first multiplexer for sequentially writing the data provided by the first multiplexer to a next of the first registers;

a second multiplexer for providing third and fourth data paths, the third data path being provided for data from the first register which is connected to the first multiplexer and the fourth data path being provided for feedback data;

N second registers for storing data from the first registers and the feedback data;

N parameter extractors for generating parameters from the data stored in the second registers;

N accumulators for accumulating the parameters extracted by the parameter extractors;

N/2 summing elements connected to the accumulators for generating transformed results and the feedback data;

a transpose buffer for transposing the transformed results from the summing elements, wherein the transposed data is generated by the transpose buffer and is stored therein during the first 1-D IDCT process; and an inverse rate buffer for acquiring data from the summing elements, during the second 1-D IDCT process, at the second rate, and outputting an N×N data at the first rate.

2. The apparatus for 2-D IDCT as claimed in claim 1 further comprising a truncator coupled between the summing elements and the transpose buffer for truncating the transformed data.

3. The apparatus for 2-D IDCT as claimed in claim 1 further comprising a truncator coupled between the summing elements and the inverse rate buffer for truncating the transformed data.

4. The apparatus for 2-D IDCT as claimed in claim 1, wherein the first registers are 1-word registers.

5. The apparatus for 2-D IDCT as claimed in claim 1, wherein the second registers are 1-word registers.

6. The apparatus for 2-D IDCT as claimed in claim 1, wherein the second registers comprise 2 sets of series connection of N/2 1-bit registers.

7. The apparatus for 2-D IDCT as claimed in claim 1, wherein each the parameter extractor comprises two ROM devices and an adder/subtractor.

8. The apparatus for 2-D IDCT as claimed in claim 1, wherein each the accumulator comprises an adder and a register.

9. The apparatus for 2-D IDCT as claimed in claim 1, wherein each the summing element comprises an adder and a subtractor.

10. The apparatus for 2-D IDCT as claimed in claim 1, wherein the rate buffer comprises means for operating in various address modes for data input and output.

11. The apparatus for 2-D IDCT as claimed in claim 1, wherein the inverse rate buffer comprises means for operating in various address modes for data input and output.

* * * * *